United States Patent [19]

Levardon

[11] Patent Number: 5,434,859

[45] Date of Patent: Jul. 18, 1995

[54] TRANSMISSION SYSTEM FOR TRANSMITTING INFORMATION AT VARIOUS RATES AND TRANSMITTER STATION AND RECEIVER STATION SUITABLE FOR SUCH A SYSTEM

[75] Inventor: Pascal Levardon, Antony, France

[73] Assignee: U.S. Philips Corporation, New York, N.Y.

[21] Appl. No.: 163,491

[22] Filed: Dec. 7, 1993

[30] Foreign Application Priority Data

Dec. 9, 1992 [FR] France ................ 92 14826

[51] Int. Cl.⁶ ............ H04J 4/00; H04J 3/22
[52] U.S. Cl. ..................... 370/84; 370/50;
370/69.1; 370/57; 370/60; 370/95.1
[58] Field of Search .......... 370/84, 82, 80, 79,
370/60, 60.1, 95.1, 95.2, 95.3, 85.7, 69.1, 120,
123, 70, 76, 50

[56] References Cited

U.S. PATENT DOCUMENTS

| | | | |
|---|---|---|---|
| 2,564,419 | 8/1951 | Brown | 370/84 |
| 4,870,641 | 9/1989 | Pattavina | 370/60 |
| 5,315,595 | 5/1994 | Allovis et al. | 370/60 |

OTHER PUBLICATIONS

J. P. Coudreuse et al., "Asynchronous Transfer Mode", Journal Commutation et Transmission, No. 3, 1990, pp. 6–16.

*Primary Examiner*—Douglas W. Olms
*Assistant Examiner*—Huy D. Vu
*Attorney, Agent, or Firm*—Leroy Eason

[57] ABSTRACT

A transmission system for transmitting data at different rates has a data input port (56) for receiving the transmit data at a certain rate during a communication period, a transmit section (31) for transmitting at a channel rate over at least one transmit channel information signals present at least at one of its incoming channel ports (I1 to I30), a receive section (42) for receiving the information signals from at least one of the channels and producing them at least at one of its outgoing channel ports (01 to 08), an output data port (57) at which the transmitted data is produced, a transmit distribution circuit (100) for connecting the data input port to a certain number of incoming channel ports as a function of the data rate during a communication period, and a receive restoring circuit (132) for connecting in corresponding fashion a number of outgoing channel ports to the output port. Such a system may be an ATM radio network.

5 Claims, 3 Drawing Sheets

TRANSMISSION SYSTEM FOR TRANSMITTING INFORMATION AT VARIOUS RATES AND TRANSMITTER STATION AND RECEIVER STATION SUITABLE FOR SUCH A SYSTEM

BACKGROUND OF THE INVENTION

1. Field of the Invention

The present invention relates to a transmission system for transmitting information signals at various rates, the system comprising at least:
- a data input port for receiving the transmit data at a certain data rate during a communication period,
- a transmit section for transmitting at a channel rate information signals present on at least one of its incoming channel ports over at least one transmit channel, a receive section for receiving the information signals coming from at least one of said channels so as to present them at at least one of its outgoing channel ports,
- an output data port for producing the transmitted data.

The present invention likewise relates to a transmitter station and a receiver station suitable for such a system.

2. Description of the Related Art

The invention finds important applications for offering to the users on board of motor cars a variety of telecommunication services: for example, telephone links which need a narrow passband and video links which need a very wide passband. This type of service is offered by the broadband ISDN system fulfilling the ATM protocol. This is described in the publication: "Asynchronous Transfer Mode" by J. P. Coudreuse et al., published in the journal Commutation et Transmission no. 3/1990. Thus there is the problem of allocating resources that remain limited especially in the field of radio telecommunications.

A system of this type is described in U.S. Pat. No. 4,870,641. In this system a group of preselected channels is allocated to ensure a high data rate, but is not of necessity assigned to a single communication. That causes this system not to be adapted to transmitting information signals in the radio mobile networks wherein the channels are frequency-division channels which utilize the radiowave propagation and for which it is necessary to connect terminals of different kinds. For reasons of radiowave propagation, the frequency-division channels relating to a link between a base station and a particular remote station are of necessity not suitable for a link to another remote station. Said Patent provides no teaching concerning dynamic transmit frequency allocation which takes the geographical position of stations into account, which stations form part of the system, nor any indication whatsoever as regards simultaneous transmission between several users.

SUMMARY OF THE INVENTION

The invention proposes a system of the type defined in the opening paragraph which makes it possible to manage in a better way the allocated resources and is particularly adapted to radio channels.

Therefore, such a system is characterized in that it further comprises:
- a transmit distribution circuit for connecting said data input port to a certain number of incoming channel ports as a function of the data rate during said communication period,
- a receive restoring circuit for connecting in corresponding fashion a number of outgoing channel ports to the output port.

BRIEF DESCRIPTION OF THE DRAWINGS

The following description accompanied by the appended drawings, all given by way of non-limiting example, will make it better understood how the invention may be realised, in the drawings.

DESCRIPTION OF THE PREFERRED EMBODIMENTS

Figure 1:
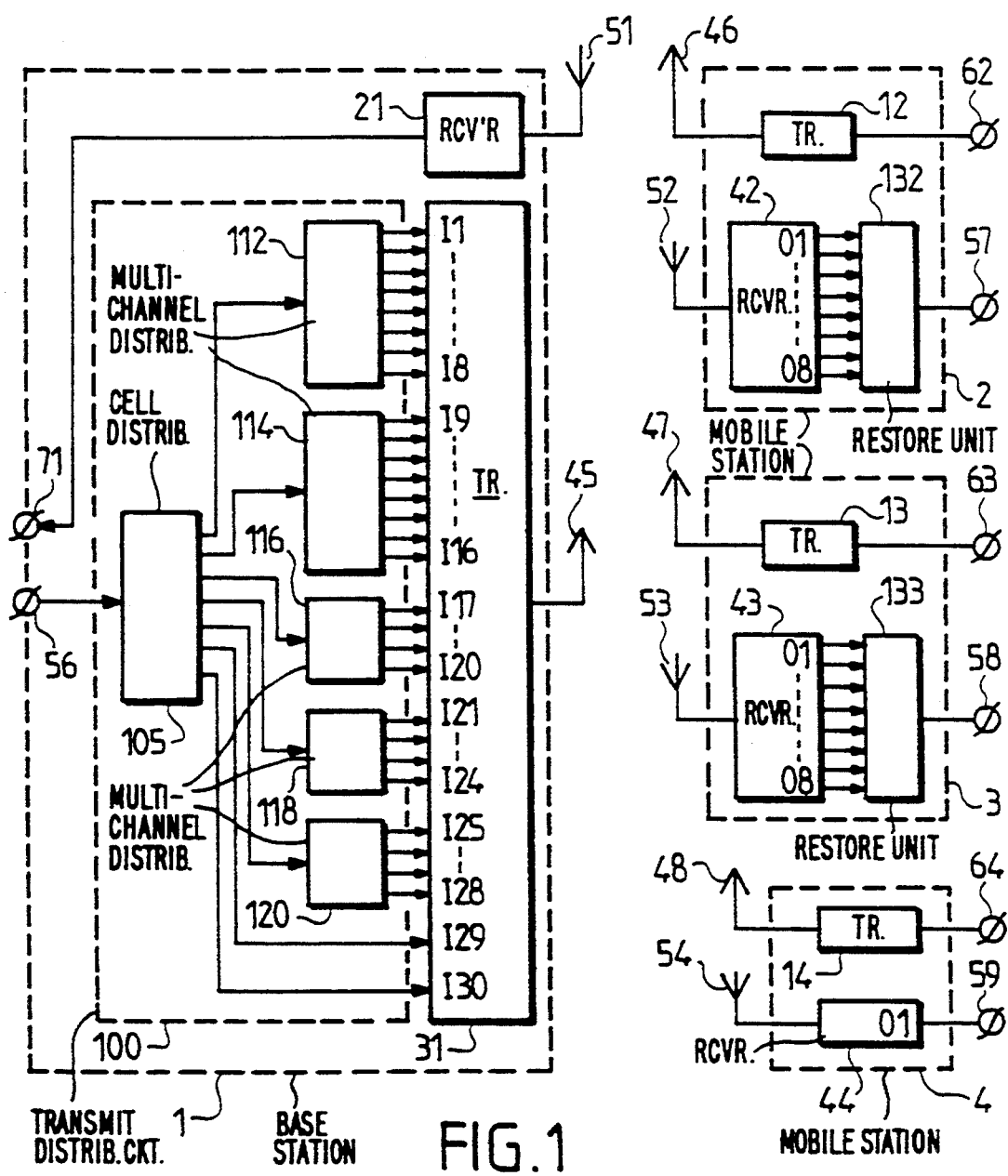
FIG. 1 shows a system according to the invention.

In FIG. 1 the transmission system according to the invention is particularly suitable for mobile radio networks communicating via a base station 1. Around this base station 1 there are three mobile stations 2, 3 and 4. Each of these various stations comprise a transmit section and a receive section. The transmit sections of the mobile stations 2, 3 and 4 carry the references 12, 13 and 14 respectively, whereas the receive section of the base station 1 carries reference 21. The transmit section of base station 1 is referenced 31 and the receive sections of the mobile stations 2, 3 and 4 are referenced 42, 43 and 44. The links between the various stations are realised over radio channels. To this effect the various stations 1, 2, 3 and 4 have transmitting aerials 45, 46, 47 and 48 and receiving aerials 51, 52, 53 and 54. The radio link used is formed, for example, by thirty 25 MHz channels in the 60 GHz very high frequency band. These transmit and receive sections operate in the frequency-division multiplex mode and manage the allocation of the frequency-division channels. Thus the transmit section 31 and the receive section 21 of the base station can use the total capacity of the link that is thirty 25 MHz channels, whereas the transmit and receive sections of the mobile stations 2 and 3 use eight channels and the transmit and receive sections of station 4 use only a single channel. To each frequency-division channel corresponds one port for an incoming channel and one port for an outgoing channel. The transmit section 31 has thirty incoming channel ports, I1 to I30. The receive sections 42 and 43 have eight outgoing channel ports, O1 to O8, whereas the receive section 44 has only one, O1. The transmit sections 12, 13 and 14 are not shown in detail, but have incoming channel ports corresponding in number to their associated receive sections. Similarly, the receive section 21 has outgoing channel ports of which the number is equal to that of the incoming channel ports of the transmit section 31. The transmit and receive sections that have just been mentioned are of the type habitually used in mobile radio networks and have therefore not been described in more detail. These sections determine from a set of allocated channels the frequency-division channels that are most suited for realising a link between two stations. In principle, each channel is a different frequency-division channel.

Figure 2:
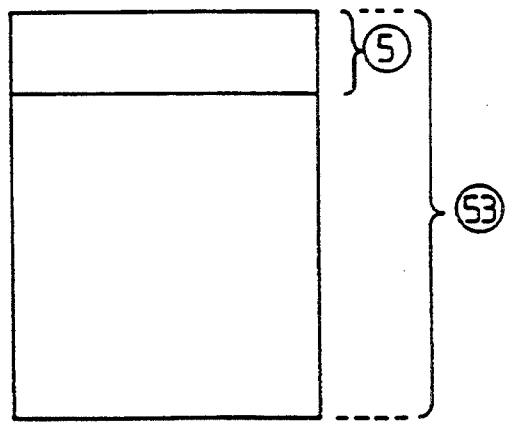
FIG. 2 shows the structure of a data cell used in the system shown in FIG. 1.

The system according to the invention has for its object to transmit, within the framework of the described embodiment, information signals according to the ATM technique (Asynchronous Transfer Mode)

which is well adapted to the broadband ISDN system. One should recollect that the ATM system which is mentioned in the above published article consists of organizing the information into bursts, or cells, whose format is shown in FIG. 2. These cells are each formed, for example, by 53 octets, of which 5 are service octets used specifically for cell routing.

The information to be transmitted from the base station 1 is applied in the form of a string of cells to a port 56 of station 1. The information transmitted to the mobile stations can be presented via the ports 57, 58 and 59 of these stations 2, 3 and 4. The information, always in the form of ATM cells, can also be transmitted in reverse direction from the mobile stations to the base station. Therefore, it can be applied to ports 62, 63 and 64 of these same stations 2, 3 and 4 and be presented at a port 71 of the base station.

According to the invention, a transmit distribution circuit 100 is provided, comprising a cell distributor 105, so that the data cells relating to a particular message and applied to port 56 are switched through either to one of the multichannel distribution circuits 112, 114, 116, 118 and 120 which is adapted to the data transmit rate, or directly to the radio ports of the radio section 31. In this described embodiment the circuits 112 and 114 are circuits having eight channels and the circuits 118 and 120 have four channels. In like fashion, receive restoring circuits 132 and 133 are provided in the mobile stations 2 and 3.

Figure 3:
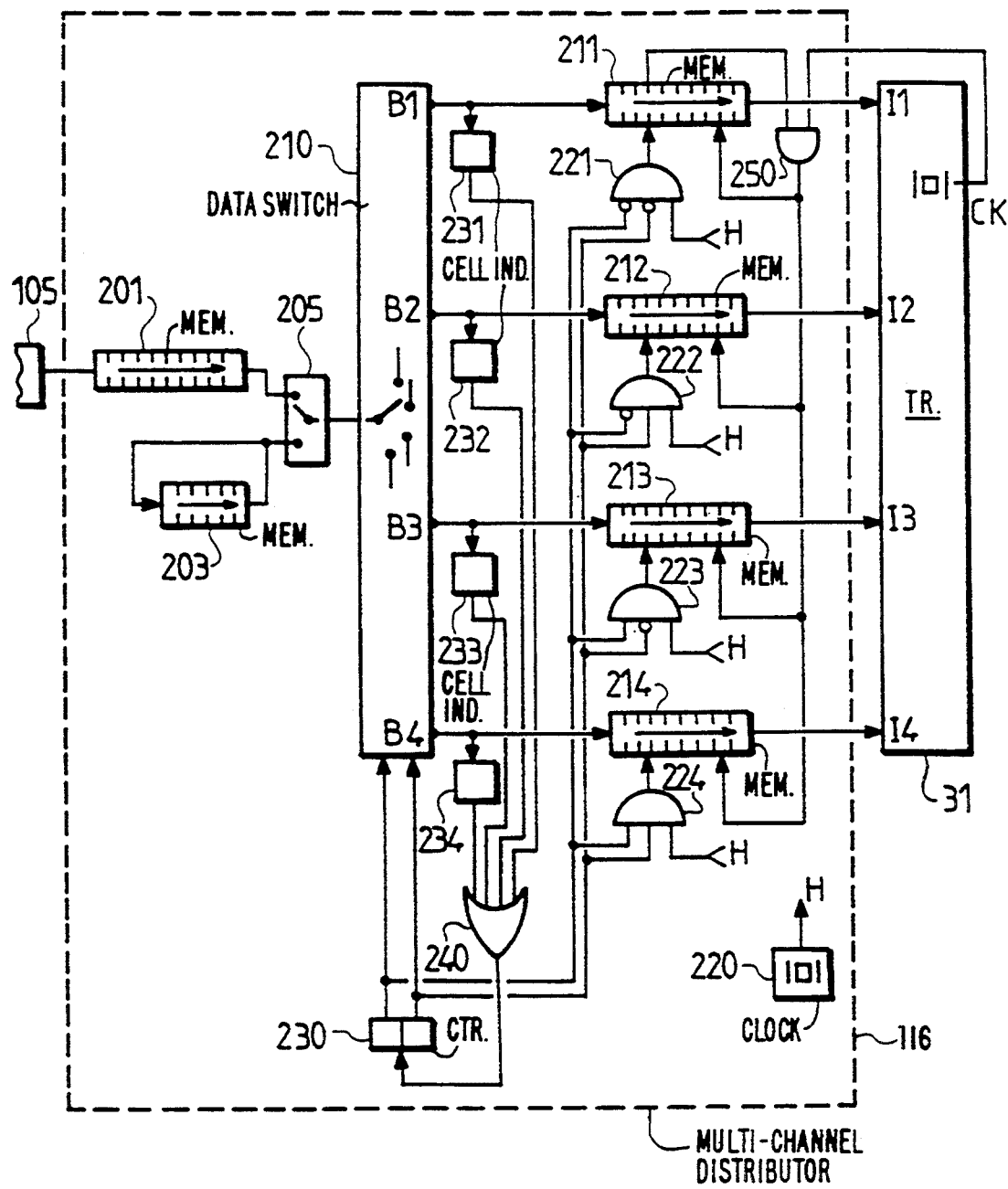
FIG. 3 shows in greater detail a distribution circuit which forms part of the system shown in FIG. 1.

FIG. 3 shows in detail the multichannel distribution circuit 116, having four channels and the structure of the other multichannel distribution circuits is directly derived therefrom.

The cells coming from the input port 56 are switched through by the cell distributor circuit 105 to circuit 118 and are stored in a first memory 201 of the first-in first-out type better known by the name of FIFO memory. A second memory 203 of the same type, looped back to itself, contains a bit structure which represents an empty ATM cell. A multiplexer 205 makes it thus possible by changing over judiciously to the output of one of these memories 201 or 203, to insert empty cells into the data stream on its output. A data switch 210 supplies the cells at a regular rate to each of four output branches B1, B2, B3 and B4. These various branches are connected via four memories 211, 212, 213 and 214 of the FIFO type to transmit ports I1, I2, I3 and I4 of the transmit section 31. These memories 211, 212, 213 and 214 are written at the rate of the local clock 220 which supplies clock signals H via the AND-gates 221, 222, 223 and 224. These gates are alternately opened by a two-position counter 230. The presence of inverters at inputs of these gates should be noted, whereby one of these gates will be rendered conductive for any bit configuration contained in the counter 230. Cell indicating circuits 231, 232, 233 and 234 respectively, are provided for each output branch circuit B1, B2, B3 and B34. These circuits produce a signal the moment a cell has passed through the circuit. An OR-gate 240 receives all these signals to increment the counter 230. The memories 211, 212, 213 and 214 are read out at the rate of the clock in a read transmit section 31, available at a port CK, provided that an AND-gate 250 is conductive. This is effected by a filler signal supplied by whichever memory 211, 212, 213 or 214 contains data corresponding to a certain number of cells.

Figure 4:
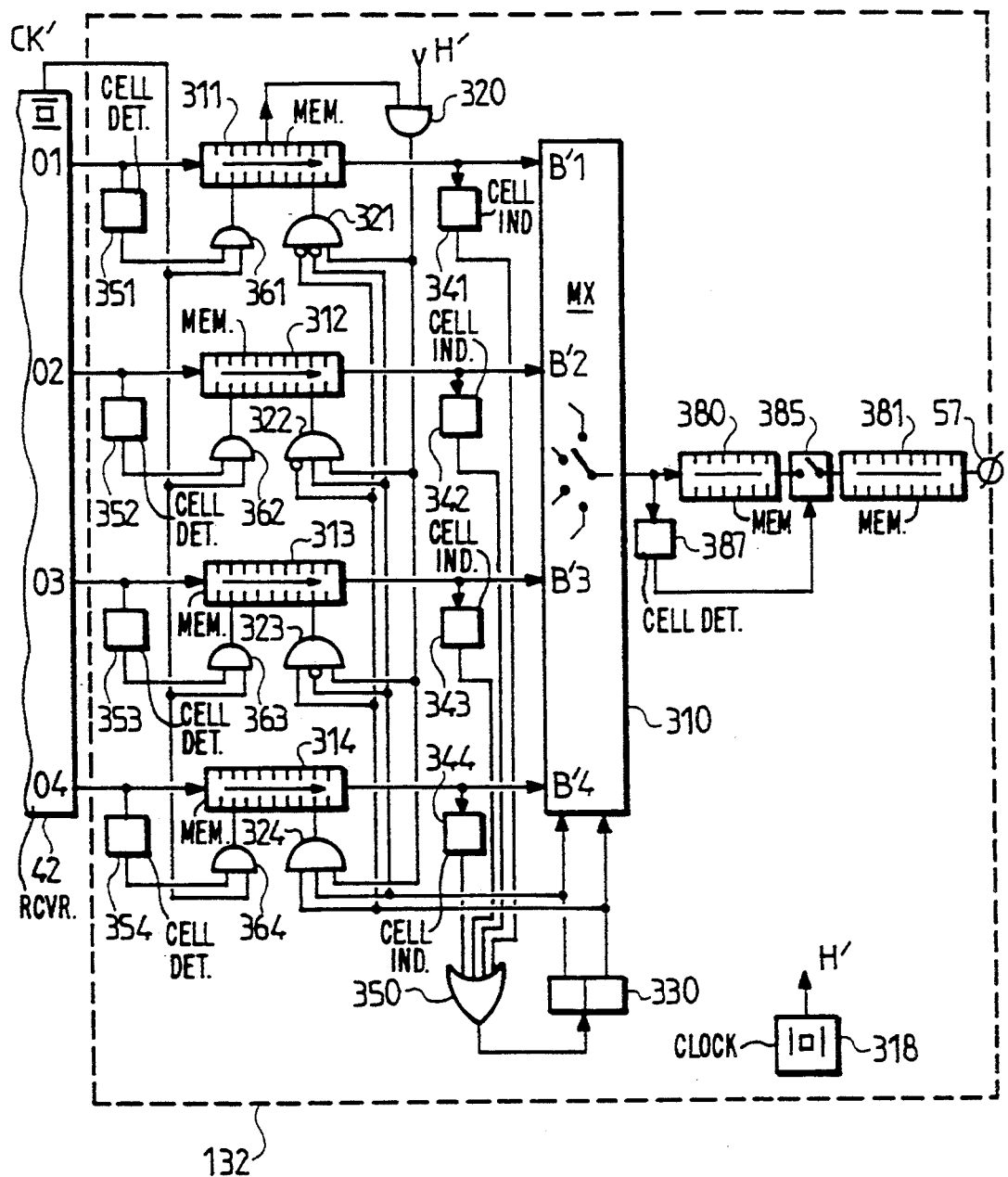
FIG. 4 shows in greater detail a restoring circuit which forms part of the system shown in FIG. 1.

FIG. 4 shows in detail the restoring circuit 132 but, for simplicity, is here assumed to have only four channels. This circuit makes it possible to re-assemble the string of the cells transmitted over the various frequency division channels and made available via input circuits B'1, B'2, B'3 and B'4 of a multiplexer 310. Memories 311, 312, 313 and 314 of the FIFO type interconnect the outputs O1, O2, O3 and O4 of the receive section with the input circuits B'1, B'2, B'3 and B'4. These memories 311, 312, 313 and 314 are written at the rate of the clock of the receive section 42, the clock signals being available at a port CK; and are read out at the rate of a local clock 318, which supplies clock signals H' to these memories through a first AND-gate 320 and AND-gates 321, 322, 323 and 324 assigned each to one of these memories. These AND-gates 321, 322, 323 and 324 are alternately opened by a two-position counter 330. The presence of inverters will be noted at inputs of these gates, so that one of these gates is rendered conductive for any bit configuration contained in the counter 330. The reading from these memories 311, 312, 313 and 314 cannot take place until one of them has reached a certain degree of filling; in FIG. 4 this is the memory 311, which renders the gate 320 conductive. At the input circuits B'1, B'2, B'3 and B'4 various cell indicating circuits 341, 342, 343 and 344 are provided. These circuits produce, as has already been observed, a signal when a cell has passed through the circuit. An OR-gate 350 receives all these signals and increments the counter 330. At the ports O1, O2, O3 and O4 various cell detecting circuits 351, 352, 353 and 354 are provided, which produce an active signal once the first cell has been detected at these ports O1, O2, O3 and O4. This makes it possible for the AND-gates 361, 362, 363 and 364, assigned to the respective memories 311, 312, 313 and 314, to be rendered conductive. The clock signals of the receive section, which are available at the port CK', can thus be applied to these memories 311, 312, 313 and 314.

At the output of the multiplexer 310 various elements have been added to eliminate the empty cells which were inserted, as required, by the memory elements 201, 203 and 205 of the multichannel distribution circuit 112 in FIG. 3. The output of the multiplexer 310 is connected to a cascade combination of two memories 380 and 381 of the FIFO type connected via an interruptor 385. This interruptor is actuated by the output signal of an empty cell detector 387. As the capacity of the memory 380 corresponds to one cell, when the output signal of the detector 387 becomes active this means that the cell contained in the memory 380 is an empty cell, the interruptor 385 is then open and the writing of the memory 381 blocked.

Such a data system operates in the following manner. When there is a request for a communication to be established from the base station between a calling subscriber and a called subscriber connected to a mobile station, the data transmit rate is known. The cell distribution circuit in the base station transmit section switches the cells relating to this communication to a frequency channel distribution circuit having a channel capacity which is capable of providing the data transmit rate. If the required rate makes a rate capacity necessary that corresponds to three channels, a frequency multichannel distribution circuit capable of managing at least that number of channels will be selected; for example, one of the distribution circuits 116 or 118 or 120 having four incoming channel ports. This assumes that the receive circuit of the called subscriber is compatible with such rate. Then, the selected frequency multichannel distribution circuit transmits, in the parallel mode, the various data cells over the four channels. For supplying these four channels, while the data rate corresponds to only three channels empty cells are inserted by means of the memory elements 201, 202 and 205. To restore the transmitted information at the receiver side, the various cells received in parallel must be placed in the right order on the transmit outgoing channel ports and also the empty cells must be suppressed. The right order is ensured by the fact that transmission of cells that are not empty is effected cyclically by reading incoming channels in the same order and by starting with the first incoming channel I1: it is there that a memory fill detector 211 is provided for suppressing empty cells, which is performed by the elements 380, 381, 385 and 387 in FIG. 4.

I claim:

1. A data communication system for transmission of data between a base station having a transmit section and a receive section and a plurality of mobile stations each having a transmit section and a receive section, the transmit section of the base station providing a plurality of multiplexed communication channels each having a channel rate constituting a limiting rate of data transmission therein, the receive section of each mobile station having a data rate corresponding to the sum of the channel rates of the channels accessed thereby; characterized in that:

said base station comprises an input for data to be transmitted to a plurality of said mobile stations, the input data being in the form of successive data cells, each cell including information identifying a data rate thereof and a mobile station to which said cell is directed;

a plurality of multichannel distributor units each of which accesses a respective group of said multiplexed channels; and a cell distributor unit coupled to said input for distributing data cells of the input data among said multichannel distributor units so that all data cells which are directed to the same mobile station and have a data rate exceeding the channel rate are provided to a selected one of said multichannel distributor units, the selected multichannel distributor unit being one which accesses a sufficient number of multiplexed channels so that the sum of the channel rates thereof at least matches the data rate of said data cells;

the receive section of a mobile station accesses the same group of multiplexed channels as the multichannel distributor unit which has been selected for data cells directed to that mobile station, and comprises a restoring unit for re-combining data cells received from said group of multichannel channels into the same sequence as said cells had in the data supplied to the input of said base station.

2. A data communication system as claimed in claim 1, wherein each multichannel distributor unit comprises means for inserting zero data cells into a sequence of data cells supplied from said cell distributor unit, so as to conform the data rate of said sequence of data cells with the sum of the channel rates of the channels which are accessed by said multichannel distributor unit.

3. A data communication system as claimed in claim 2, wherein said restoring unit comprises means for removing zero data cells from the sequence of cells produced by said restoring unit.

4. A base station for use in a data communication system as claimed in claim 1.

5. A mobile station for use in a data communication system as claimed in claim 1.

* * * * *